(12) United States Patent
Moscrop et al.

(10) Patent No.: US 7,794,532 B2
(45) Date of Patent: Sep. 14, 2010

(54) MAGENTA DYES AND THEIR USE IN INK- JET PRINTING

(75) Inventors: Clive Moscrop, Manchester (GB); Rachel Anne James, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 11/919,867

(22) PCT Filed: Apr. 28, 2006

(86) PCT No.: PCT/GB2006/001579

§ 371 (c)(1),
(2), (4) Date: Jan. 13, 2009

(87) PCT Pub. No.: WO2006/120383

PCT Pub. Date: Nov. 16, 2006

(65) Prior Publication Data

US 2009/0214788 A1    Aug. 27, 2009

(30) Foreign Application Priority Data

May 6, 2005    (GB) ................. 0509342.2

(51) Int. Cl.
C09D 11/02 (2006.01)
C07D 239/70 (2006.01)
C07D 221/18 (2006.01)
C07D 231/54 (2006.01)
B41J 2/01 (2006.01)

(52) U.S. Cl. ................. 106/31.47; 106/31.49; 544/248; 546/76; 548/357.1; 347/100

(58) Field of Classification Search ........... 106/31.47, 106/31.49; 544/248; 546/76; 548/357.1; 347/100
See application file for complete search history.

(56) References Cited

U.S. PATENT DOCUMENTS

| 1,747,520 | A | * | 2/1930 | Luttringhaus et al. ....... 544/248 |
| 1,747,521 | A | * | 2/1930 | Luttringhaus et al. ....... 544/248 |
| 1,817,995 | A | * | 8/1931 | Luttringhaus et al. ....... 544/248 |
| 1,948,178 | A | * | 2/1934 | Koeberle et al. ......... 548/357.1 |
| 2,226,062 | A | * | 12/1940 | Koch et al. ............... 548/357.1 |
| 2,802,829 | A | * | 8/1957 | Schmidt-Nickels ...... 548/357.1 |
| 2,817,667 | A | * | 12/1957 | Schmidt-Nickels et al. ....... 548/357.1 |
| 2,871,240 | A | * | 1/1959 | Randall et al. ............. 544/248 |
| 3,534,038 | A | * | 10/1970 | Machatzke .................. 544/248 |
| 3,730,955 | A | * | 5/1973 | Jaffe .......................... 544/248 |
| 4,001,170 | A | * | 1/1977 | Wick .......................... 544/248 |
| 4,892,957 | A | * | 1/1990 | Hildebrand ............. 548/357.1 |
| 6,929,361 | B2 | * | 8/2005 | Matsumoto et al. ...... 106/31.47 |
| 7,011,701 | B2 | * | 3/2006 | Iwamoto et al. .......... 106/31.47 |
| 7,323,045 | B2 | * | 1/2008 | Hanmura et al. ......... 106/31.47 |
| 2004/0048745 | A1 | | 3/2004 | Kitamura et al. ............ 503/201 |
| 2004/0174420 | A1 | | 9/2004 | Kitamura et al. ............ 347/100 |
| 2009/0285988 | A1 | * | 11/2009 | Matsumoto et al. ...... 106/31.47 |
| 2009/0285990 | A1 | * | 11/2009 | Nishino et al. ........... 106/31.47 |
| 2009/0286051 | A1 | * | 11/2009 | Matsumoto et al. ...... 106/31.47 |

FOREIGN PATENT DOCUMENTS

| EP | 0 927 747 | | 7/1999 |
| EP | 1 437 385 | | 7/2004 |
| EP | 1 626 072 | | 2/2006 |
| FR | 1 394 618 | | 4/1976 |
| GB | 1 047 297 | | 11/1966 |
| JP | 62 192474 | | 8/1987 |
| WO | WO 03/027185 | * | 4/2003 |

* cited by examiner

*Primary Examiner*—Helene Klemanski
(74) *Attorney, Agent, or Firm*—Morgan Lewis & Bockius LLP

(57) ABSTRACT

A water-soluble dye of the Formula (1):

$$D_1\text{-}L\text{-}D_2 \qquad \text{Formula (1)}$$

wherein $D_1$ and $D_2$ each independently is an anthrapyridone, anthrapyrazole, anthrapyrimidine or anthrapyrimidone group; and L is a single covalent bond or a linking group which permits at least partial delocalisation of electrons between $D_1$ and $D_2$, compositions and inks containing the dye, and printing processes, printed material and ink-jet printer cartridges based on use of the dye.

24 Claims, No Drawings

MAGENTA DYES AND THEIR USE IN INK-JET PRINTING

This invention relates to dyes, compositions and inks, to printing processes, to printed substrates and to ink jet printer cartridges.

Ink jet printing is a non-impact printing technique in which droplets of ink are ejected through a fine nozzle onto a substrate without bringing the nozzle into contact with the substrate. The set of inks used in this technique typically comprise yellow, magenta, cyan and black inks.

With the advent of high-resolution digital cameras and ink jet printers it is becoming increasingly common for consumers to print off photographs using an ink jet printer. This avoids the expense and inconvenience of conventional silver halide photography and provides a print quickly and conveniently.

While ink jet printers have many advantages over other forms of printing and image development there are still technical challenges to be addressed. For example, there are the contradictory requirements of providing ink colorants that are soluble in the ink medium and yet do not run or smudge excessively when printed on paper. The inks need to dry quickly to avoid sheets sticking together after they have been printed, but they should not form a crust over the tiny nozzle used in the printer. Storage stability is also important to avoid particle formation that could block the tiny nozzles used in the printer especially since consumers can keep an ink jet ink cartridge for several months. Furthermore, the resultant images desirably do not fade rapidly on exposure to light or common oxidising gases such as ozone.

According to the present invention there is provided a water-soluble dye of the Formula (1):

$$D_1\text{-}L\text{-}D_2 \qquad \text{Formula (1)}$$

wherein:

$D_1$ and $D_2$ each independently is an anthrapyridone, anthrapyrazole, anthrapyrimidine or anthrapyrimidone group; and L is a single covalent bond or a linking group which permits at least partial delocalisation of electrons between $D_1$ and $D_2$.

In preferred embodiments of the present invention $D_1$ and $D_2$ are anthrapyridone groups; or $D_1$ and $D_2$ are anthrapyrazole groups; or $D_1$ and $D_2$ are anthrapyrimidine groups; or $D_1$ and $D_2$ are anthrapyrimidone groups. $D_1$ and $D_2$ may be the same or different to each other.

When L is a linking group which permits at least partial delocalisation of electrons between $D_1$ and $D_2$ it is preferably the divalent ethane radical, azo, the divalent ethyne radical or a phenylene group. Such groups allow complete delocalisation of electrons from $D_1$ to $D_2$ and vice versa. Preferably L is a single covalent bond.

The dye of Formula (1) is preferably water-soluble in both its oxidised and reduced forms.

The dye of Formula (1) preferably comprises at least one acidic water-solubilising group, more preferably at least one water-solubilising group selected from sulpho, carboxy and phosphate. Such groups may be in free acid or salt form. Preferred salts are alkali metal salts, especially lithium, sodium and potassium, ammonium and substituted ammonium salts (including quaternary amines such as $((CH_3)_4N^+)$ and mixtures thereof. Especially preferred are salts with sodium, lithium, ammonia and volatile amines, more especially sodium salts. Compounds of Formula (1) may be converted into salt form using known techniques.

The dyes of Formula (1) may contain any of a wide variety of substituents, particularly wherein at least one of $D_1$ and $D_2$ carries an electron donating group, an electron withdrawing group or both an electron donating group and an electron withdrawing group. Preferred electron donating group(s) are selected from optionally substituted alkyl, optionally substituted alkoxy and optionally substituted amino. Preferred electron withdrawing group(s) are selected from nitro, sulphonamido and ester groups.

Preferred anthrapyridone groups are of the formula:

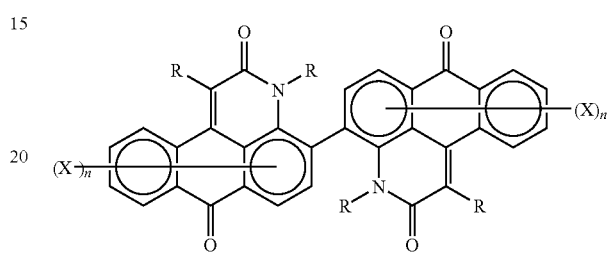

wherein:

each R independently is H or optionally substituted alkyl or aryl;

each X independently is a water-solubilising group, halo, nitro or an optionally substituted alkyl, alkoxy, ester, sulphonamide or carbonamido group; and one n is 1 or 2 and the other n is 0, 1 or 2.

Preferred anthrapyrazole groups are of the formula:

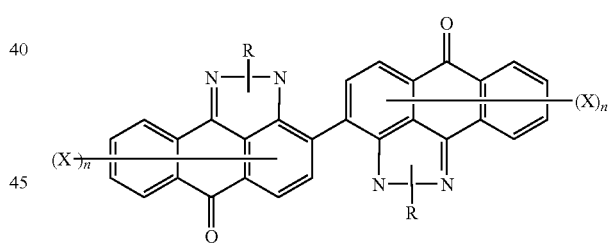

wherein R, X and n are as hereinbefore defined.

Preferred anthrapyrimidine groups are of the formula:

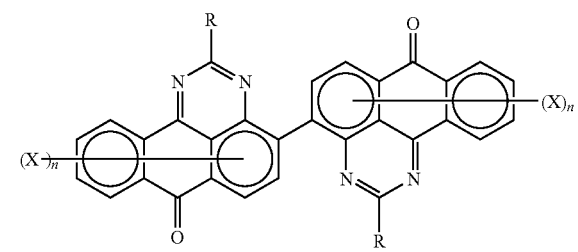

wherein R, X and n are as hereinbefore defined.

Preferred anthrapyrimidone groups are of the formula:

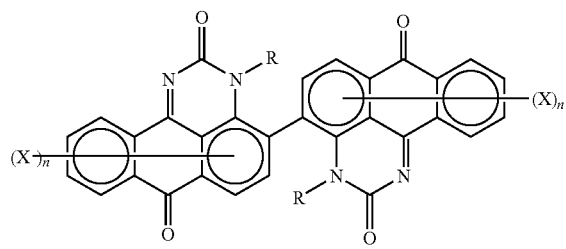

wherein R, X and n are as hereinbefore defined.

Preferred optionally substituted alkyl groups are optionally substituted $C_{1-4}$-alkyl (especially methyl). Preferred optionally substituted aryl groups are optionally substituted phenyl (especially phenyl carrying one or two sulphonic acid groups). Preferred optionally substituted alkoxy groups are optionally substituted $C_{1-4}$-alkoxy (especially methoxy). The optional substituents are preferably selected from hydroxyl, halo, quaternary ammonium, acid, nitro, amino, substituted amino, aryl and alkoxy.

The compounds of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the compounds of Formula ((1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endomethylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide. It is especially preferred that dyes of Formula (1). It is especially preferred that dyes of Formula (1) are free from aliphatic sulfonyl groups which contain a sulfate group in a beta-position to the sulfur atom (i.e. sulphato groups, well known to dye chemists as the precursors to reactive vinyl sulfone dyes).

Preferably the dyes of Formula (1) have a solubility in water at 20° C. of from 1 to 10%. The dyes of Formula (1) may exist in tautomeric forms other than those shown in this specification. These tautomers are included within the scope of the present invention. Also the precise position of some substituents can be uncertain in some dyes of Formula (1).

The dyes of Formula (1) may be prepared by reacting together a compound of formula $D_1$-L-X with a compound of formula H-$D_2$ wherein $D_1$, $D_2$ and L are as hereinbefore defined and X is a leaving group (e.g. a labile halogen group), optionally followed by sulphonation. Alternatively the dyes of Formula (1) may be prepared by adding one or more water-solubilising groups to a compound of Formula (1) which is not water-soluble, for example by sulphonation (e.g. using oleum or concentrated sulphuric acid) or by hydrolysis of an ester group to create an acid group (e.g. using aqueous alkali). Many dyes of Formula (1) wherein L is a single covalent bond may be prepared by heating $D_1$ and $D_2$ together in strong alkali, e.g. in sodium hydroxide. Under these conditions $D_1$ and $D_2$ may fuse together to give a dye of Formula (1).

According to a second aspect of the present invention there is provided a composition comprising a dye of Formula (1) as described in the first aspect of the present invention and a liquid medium.

The liquid medium preferably comprises a mixture of water and organic solvent.

Preferably the composition has a pH of 3 to 11.

Preferably the composition is an ink jet printing ink.

Preferred compositions according to the second aspect of the invention comprise:

(a) from 0.01 to 30 parts of a dye of Formula (1) according to the first aspect of the present invention; and (b) from 70 to 99.99 parts of a liquid medium;

wherein all parts are by weight

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

Preferably component (a) is completely dissolved in component (b). Preferably component (a) has a solubility in component (b) at 20° C. of at least 5%. This allows the preparation of liquid dye concentrates that may be used to prepare more dilute inks and reduces the chance of the dye precipitating if evaporation of the liquid medium occurs during storage.

The compositions may be incorporated in an ink jet printer as a high concentration ink, a low concentration ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink), wherein all parts are by weight.

Preferred liquid media comprise water and organic solvent.

The weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy) ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfones such as sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP-A-425,150.

The liquid media may of course contain additional components conventionally used in ink jet printing inks, for example viscosity and surface tension modifiers, corrosion inhibitors, biocides, kogation reducing additives and surfactants which may be ionic or non-ionic.

Although not usually necessary, further colorants may be added to the composition to modify the shade and performance properties. Examples of such colorants include C.I. Direct Yellow 86, 132,142 and 173; C.I. Direct Blue 307; C.I. Food Black 2; C.I. Direct Black 168 and 195; and C.I. Acid Yellow 23.

It is preferred that the composition according to the invention is an ink suitable for use in an ink jet printer. Inks suitable for use in an ink jet printer are inks which are able to repeatedly fire through an ink jet printing head without causing blockage of the fine nozzles.

Inks suitable for use in an ink jet printer preferably have a viscosity of less than 20 cP, more preferably less than 10 cP, especially less than 5 cP, at 25° C.

Inks suitable for use as ink jet printer ink preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colourant or additive incorporated in the ink).

Preferably the ink has been filtered through a filter having a mean pore size below 10 μm, more preferably below 3 μm, especially below 2 μm, more especially below 1 μm. This filtration removes particulate matter that could otherwise block the fine nozzles found in many ink jet printers.

Preferably the ink contains less than 500 ppm, more preferably less than 250 ppm, especially less than 100 ppm, more especially less than 10 ppm in total of halide ions.

A third aspect of the invention provides a process for forming an image on a substrate comprising applying an ink according to the second aspect of the invention thereto by means of an ink jet printer.

The ink jet printer preferably applies the ink to the substrate in the form of droplets that are ejected through a small orifice onto the substrate. Preferred ink jet printers are piezoelectric ink jet printers and thermal ink jet printers. In thermal ink jet printers, programmed pulses of heat are applied to an ink in a reservoir by means of a resistor adjacent to the orifice, thereby causing the ink to be ejected from the orifice in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred.

A fourth aspect of the present invention provides a printed substrate, preferably paper, plastic, a textile, metal or glass, more preferably paper, an overhead projector slide or a textile material, especially paper more especially plain, coated or treated paper printed with a compound as described in the first aspect of the invention, a composition according to the second aspect of the invention or by means of a process according to the third aspect of the invention.

It is especially preferred that the printed material of the fourth aspect of the invention is a print on photographic quality paper using a process according to the third aspect of the invention.

A fifth aspect of the present invention provides an ink jet printer cartridge comprising a chamber and an ink composition according to the second aspect of the present invention, wherein the ink is present in said chamber.

The invention is further illustrated by the following Examples in which all parts and percentages are by weight unless otherwise stated.

EXAMPLE 1

Preparation of:

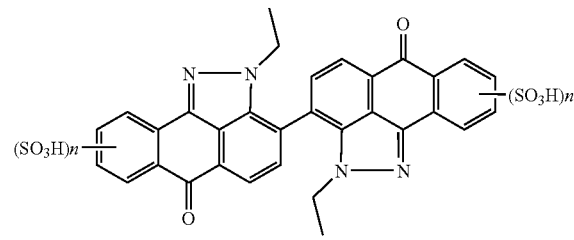

wherein one n is 1 and the other is 1 or 0.

Stage 1—Preparation of 1-hydrazinoanthraquinone

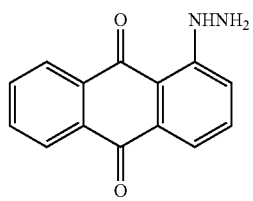

1-Aminoanthraquinone (23 g 0.1 mol) was added portion wise with stirring to nitrosyl sulphuric acid 40% (20 ml) at 0-5° C. over 15 minutes. The mixture was then allowed to warm to 15° C. and stirred for 4 hours. The mixture was then drowned on to ice and water (140 g) and added slowly to ice and water (200 g) containing sodium carbonate (53 g 0.5 mol) and anhydrous sodium sulphite (12.6 g 0.1 mol). The mixture was stirred for a further hour at 0-5° C. and then heated to 90° C. for 2 hours. The mixture was then acidified slowly using hydrochloric acid and heated to 95° C. until sulphur dioxide was no longer evolved. The mixture was then cooled to room temperature, the precipitate collected by filtration and washed acid-free with water.

Stage 2—Preparation of Pyrazoleanthrone

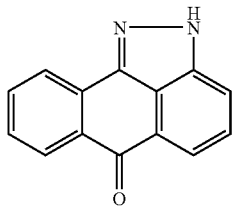

The product of Stage 1 (11.9 g 0.05 mol) was added to sulphuric acid 98% (70 ml) portionwise with stirring at 40-45° C. The mixture was stirred for 16 hours then heated to 95° C., stirred for 1 hour then added to ice/water (200 g). The product was isolated by filtration and washed with water until free from acid. The product was dried at 100° c to give pyrazoleanthrone (8.1 g at 96% strength (yield of 88.36%)) as a yellow solid (mpt 280-282° C.).

Stage 3—Preparation of Dipyrazoleanthrone

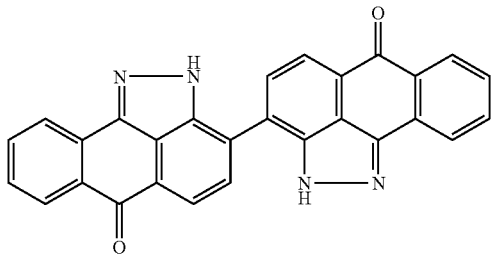

Potassium hydroxide (22.2 g 0.4 mol) was added portionwise with care to butan-1-ol (45 ml) and the mixture heated to 120° C. until a smooth melt was obtained. The mixture was allowed to cool to 100° C. and then the product from Stage 2 (5 g at 96% 0.022 mol) was added portionwise and heated to 120-125° C. for 16 hours. The mixture was cooled, drowned into water (200 ml) and heated to 70° C. until dipyrazoleanthrone precipitated. The precipitate was isolated by filtration, washed with hot water and dried to give dipyrazoleanthrone as a red solid (4.2 g, yield 94%).

Stage 4—Preparation of N-N-diethyldipyrazoleanthrone

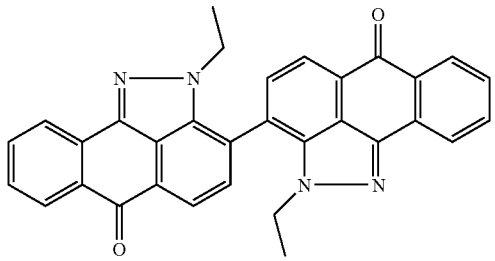

diethylsulphate (2.93 g, 0.019 mol) was added with stirring at 180° C. to a mixture of sodium carbonate (1.94 g, 0.018 mol) and the product from Stage 3 (4 g, 0.009 mol) in nitrobenzene (20 g). The mixture was heated at this temperature for 3 hours then cooled to 90° C. and filtered. The solid obtained was washed with methanol (400 ml), then with hot water, then dried at 100° C. to give N-N-dipyrazoleanthronyl as a red solid (2.61 g, 60% yield).

Stage 5—Sulphonation of N-N-diethyldipyrazoleanthrone

The product of Stage 4 (2.5 g) was added portionwise, with stirring at 0-5° C., to 65% fuming sulphuric acid (30 ml). The resultant solution was allowed to warm to room temperature and stirred for 2 hours, then heated to 100° C. for 4 hours. The solution was allowed to cool to room temperature and added with care to ice/water (200 g) at 0-5° C. with stirring to give a red coloured solution. Sodium chloride was added to 10% and the resultant precipitate collected and dried to give the title dye (2.89 g).

COMPARATIVE EXAMPLES

Comparative Examples C1 was prepared as described in Example 1 of U.S. Pat. No. 5,599,386

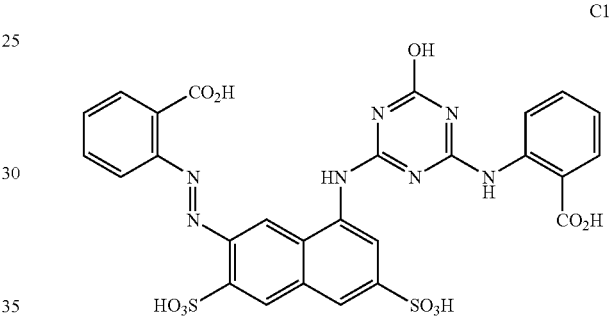

Comparative Example C2 was prepared as described for Dye 101 in U.S. Pat. No. 5,824,785.

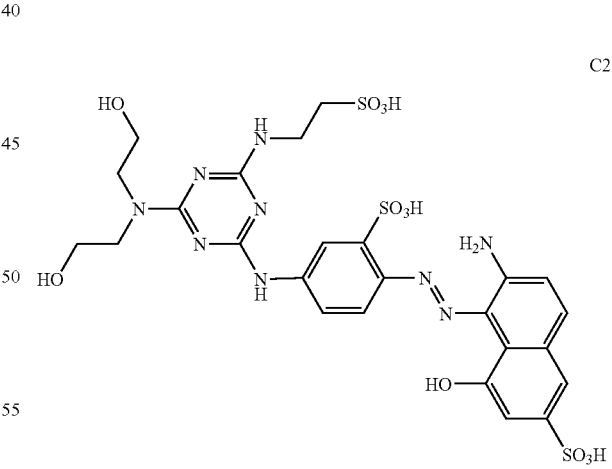

EXAMPLE 2

Preparation of Inks

Inks were prepared from the Comparative Dyes and the dye of Example 1, as shown in Table 1, by dissolving 3 g of a dye in 97 ml of a liquid medium consisting of 5 parts 2-pyrrolidone; 5 parts thiodiethylene glycol; 1 part Surfynol™ 465 and 89 parts water and adjusting the pH to between pH 8 to 9 with sodium hydroxide. Surfynol™ 465 is a surfactant from Air Products.

TABLE 1

| Dye of Example | Ink Example |
|---|---|
| 1 | 1 |
| Comparative Dye 1 | Ink C1 |
| Comparative Dye 2 | Ink C2 |

Ink-jet Printing

Inks prepared as described above were filtered through a 0.45 micron nylon filter and then incorporated into empty print cartridges using a syringe.

These inks were then printed on to Epson Premium Glossy Photo Paper (SEC PM) and Canon Premium PR101 Photo Paper (PR101).

The prints so formed, at 70% depth, were tested for ozone fastness by exposure to 1 ppm ozone at 40° C., 50% relative humidity for 24 hrs in a Hampden 903 Ozone cabinet. Fastness of the printed ink to ozone is judged by the difference in the optical density before and after exposure to ozone.

Optical density measurements were performed using a Gretag spectrolino spectrophotometer set to the following parameters:

| | |
|---|---|
| Measuring Geometry | 0°/45° |
| Spectral Range | 400-700 nm |
| Spectral Interval | 20 nm |
| Illuminant | D65 |
| Observer | 2° (CIE 1931) |
| Density | Ansi A |
| External Filler | None |

Ozone fastness was assessed by the percentage change in the optical density of the print, where a lower figure indicates higher fastness. Results are shown in Table 2

TABLE 2

| Example | OF (SEC PM) | OF (PR 101) |
|---|---|---|
| 1 | 1 | 0 |
| Ink C1 | 34 | 21 |
| Ink C2 | 90 | 84 |

Table 2 shows that the ink of the present invention have higher ozone fastness than the comparative dyes.

Further Inks

The inks described in Tables A and B may be prepared from the dye of Example 1 Numbers quoted refer to the number of parts of the relevant ingredient and all parts are by weight. The inks may be applied to paper by thermal or piezo ink jet printing.

The following abbreviations are used in Tables A and B:
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$
TBT=tertiary butanol
TDG=thiodiglycol and
NaOH=sodium hydroxide

TABLE A

| Dye Content | Water | PG | DEG | NMP | DMK | NaOH | Na Stearate | IPA | MEOH | 2P | MIBK |
|---|---|---|---|---|---|---|---|---|---|---|---|
| 2.0 | 80 | 5 | | 6 | 4 | | | | | 5 | |
| 3.0 | 90 | | 5 | 5 | | 0.2 | | | | | |
| 1.0 | 85 | 3 | | 3 | 3 | | | | 5 | 1 | |
| 2.1 | 91 | | 8 | | | | | | | | 1 |
| 3.1 | 86 | 5 | | | | | 0.2 | 4 | | | 5 |
| 1.1 | 81 | | | 9 | | 0.5 | 0.5 | | | 9 | |
| 2.5 | 60 | 4 | 15 | 3 | 3 | | | 6 | 10 | 5 | 4 |
| 5 | 65 | | 20 | | | | | 10 | | | |
| 2.4 | 75 | 5 | 4 | | 5 | | | | 6 | | 5 |
| 4.1 | 80 | 3 | 5 | 2 | 10 | | 0.3 | | | | |
| 3.2 | 65 | | 5 | 4 | 6 | | | 5 | 4 | 6 | 5 |
| 5.1 | 96 | | | | | | | 4 | | | |
| 1.8 | 90 | 5 | | | | | | 5 | | | |
| 1.0 | 80 | 2 | 6 | 2 | 5 | | | 1 | | 4 | |
| 1.8 | 80 | | 5 | | | | | | | 15 | |
| 2.6 | 84 | | | 11 | | | | | 5 | | |
| 3.3 | 80 | 2 | | | 10 | | | | 2 | | 6 |
| 2.0 | 90 | | | | 7 | 0.3 | | 3 | | | |
| 5.4 | 69 | 2 | 20 | 2 | 1 | | | | | 3 | 3 |
| 6.0 | 91 | | | 4 | | | | | 5 | | |

TABLE B

| Dye Content | Water | PG | DEG | NMP | CET | TBT | TDG | BDL | PHO | 2P | P12 |
|---|---|---|---|---|---|---|---|---|---|---|---|
| 3.0 | 80 | 15 | | 0.2 | | | | | | 5 | |
| 9.0 | 90 | | 5 | | | | | | 1.2 | | 5 |
| 1.5 | 85 | 5 | 5 | | 0.15 | 5.0 | 0.2 | | | | |
| 2.5 | 90 | | 6 | 4 | | | | | 0.12 | | |
| 3.1 | 82 | 4 | 8 | | 0.3 | | | | | | 6 |
| 0.9 | 85 | | 10 | | | | | 5 | 0.2 | | |
| 8.0 | 90 | | 5 | 5 | | | 0.3 | | | | |
| 4.0 | 70 | | 10 | 4 | | | | 1 | | 4 | 11 |
| 2.2 | 75 | 4 | 10 | 3 | | | | 2 | | 6 | |
| 1.0 | 91 | | | 6 | | | | | | 3 | |
| 0.9 | 76 | | 9 | 7 | | 3.0 | | | 0.95 | 5 | |
| 5.0 | 78 | 5 | 11 | | | | | | | 6 | |
| 5.4 | 86 | | | 7 | | | | | | 7 | |
| 2.1 | 70 | 5 | 5 | 5 | 0.1 | 0.2 | 0.1 | 5 | 0.1 | 5 | |
| 2.0 | 90 | | 10 | | | | | | | | |
| 2 | 88 | | | | | | 10 | | | | |
| 5 | 78 | | | 5 | | | 12 | | | 5 | |
| 8 | 70 | 2 | | 8 | | | 15 | | | 5 | |
| 1 | 80 | | | | | | 8 | | | 12 | |
| 1 | 80 | | 10 | | | | | | | | |

The invention claimed is:

1. A water-soluble dye of the Formula (1):

$$D_1\text{-}L\text{-}D_2 \qquad \text{Formula (1)}$$

wherein:
$D_1$ and $D_2$ each independently is an anthrapyridone, anthrapyrazole, anthrapyrimidine or anthrapyrimidone group; and
L is a single covalent bond.

2. A dye according to claim 1 wherein $D_1$ and $D_2$ are anthrapyridone groups.

3. A dye according to claim 1 wherein $D_1$ and $D_2$ are anthrapyrazole groups.

4. A dye according to claim 1 wherein $D_1$ and $D_2$ are anthrapyrimidine groups.

5. A dye according to claim 1 wherein $D_1$ and $D_2$ are anthrapyrimidone groups.

6. A dye according to claim 1 which is water-soluble in both its oxidised and reduced forms.

7. A dye according to claim 1 which comprises at least one water-solubilising group selected from the group consisting of sulpho, carboxy and phosphate.

8. A dye according to claim 1 wherein at least one of $D_1$ and $D_2$ carries an electron donating group, an electron withdrawing group or both an electron donating group and an electron withdrawing group.

9. A dye according to claim 8 wherein the electron donating group(s) are selected from the group consisting of optionally substituted alkyl, optionally substituted alkoxy and optionally substituted amino.

10. A dye according to claim 8 wherein the electron withdrawing group(s) are selected from the group consisting of nitro, sulphonamido and ester groups.

11. A dye according to claim 9 wherein the optionally substituted alkyl group is an optionally substituted $C_{1-4}$-alkyl and the optionally substituted alkoxy group is an optionally substituted $C_{1-4}$-alkoxy.

12. A dye according to claim 9 wherein the optional substituents are selected from the group consisting of hydroxyl, halo, quaternary ammonium, acid, nitro, amino, substituted amino, aryl and alkoxy.

13. A dye according to claim 1 which is free from sulphato groups.

14. A dye according to claim 1 which has a solubility in water at 20° C. of from 1 to 10%.

15. A composition comprising a compound according to claim 1 and a liquid medium.

16. A composition according to claim 15 wherein the liquid medium comprises a mixture of water and organic solvent.

17. A composition according to claim 15 having a pH of 3 to 11.

18. A composition according to claim 15 which is an ink jet printing ink.

19. A process for forming an image on a substrate comprising applying thereto an ink according to claim 18 by means of an ink jet printer.

20. An ink jet printer cartridge comprising a chamber and an ink wherein the ink is as defined in claim 18.

21. A water-soluble dye of the Formula (1):

$$D_1\text{-}L\text{-}D_2 \qquad \text{Formula (1)}$$

wherein:
$D_1$ and $D_2$ each independently is an anthrapyrazole, anthrapyrimidine or anthrapyrimidone group; and
L is a single covalent bond or a linking group which permits at least partial delocalisation of electrons between $D_1$ and $D_2$.

22. A composition comprising a compound according to claim 21 and a liquid medium.

23. A composition according to claim 22 which is an ink jet printing ink.

24. A process for forming an image on a substrate comprising applying thereto an ink according to claim 23 by means of an ink jet printer.

* * * * *